United States Patent [19]

Notsu et al.

[11] Patent Number: 5,699,767
[45] Date of Patent: Dec. 23, 1997

[54] GAS ENGINE

[75] Inventors: Ikurou Notsu; Hiroshi Matsuda; Nobuo Hamazaki; Yutaka Takada; Tatsuji Miyata; Akira Nakamura, all of Ageo, Japan

[73] Assignee: Nissan Diesel Motor Co., Ltd., Ageo, Japan

[21] Appl. No.: 549,767
[22] PCT Filed: Apr. 28, 1994
[86] PCT No.: PCT/JP94/00722
  § 371 Date: Mar. 7, 1996
  § 102(e) Date: Mar. 7, 1996
[87] PCT Pub. No.: WO95/30086
  PCT Pub. Date: Nov. 9, 1995
[51] Int. Cl.$^6$ ............................................. F02D 9/06
[52] U.S. Cl. .................... 123/323; 123/527; 123/27 GE
[58] Field of Search ........................... 123/320, 322, 123/323, 198 DB, 525–529, 27 GE

[56] References Cited

U.S. PATENT DOCUMENTS

| | | | |
|---|---|---|---|
| 4,835,963 | 6/1989 | Hardy | 123/323 |
| 5,150,678 | 9/1992 | Wittmann et al. | 123/323 |
| 5,251,602 | 10/1993 | Kurihara | 123/527 |
| 5,282,399 | 2/1994 | Sano et al. | 123/323 |
| 5,337,722 | 8/1994 | Kurihara | 123/527 |
| 5,370,098 | 12/1994 | Iida | 123/527 |
| 5,483,927 | 1/1996 | Letang et al. | 123/322 |
| 5,529,048 | 6/1996 | Kurihara et al. | 123/527 |
| 5,549,097 | 8/1996 | Nimberger | 123/529 |

FOREIGN PATENT DOCUMENTS

280188  8/1988  European Pat. Off. ........ 123/198 DB

*Primary Examiner*—Erick R. Solis
*Attorney, Agent, or Firm*—Armstrong, Westerman, Hattori, McLeland & Naughton

[57] ABSTRACT

A control system for and exhaust retarder in and exhaust pipe of an engine to which a mixer and throttle valve are connected including terminating means for terminating fuel feed into the engine upon receipt of an exhaust retarder shutter operation signal, an oxygen richness sensor on the exhaust pipe and a control system for operating an actuator for the exhaust retarder shutter when sensed oxygen density in the exhaust pipe deviates from a predetermined oxygen range.

1 Claim, 9 Drawing Sheets

GAS ENGINE

BACKGROUND OF THE INVENTION

1 Field of the Invention

The present invention relates to a gas engine, and more particularly to a control system for an exhaust retarder of an engine to which a mixer and a throttle valve are connected, after a fuel shut-off valve which is positioned after a compressed natural gas (hereinafter referred to as "CNG") cylinder and wherein an intake pipe is connected with a by-pass passage to bypass the mixer and throttle valve. The present invention also relates to an exhaust retarder system of the engine including an exhaust shutter on an exhaust pipe. The present invention further relates to a mixing system of a natural gas engine wherein there are provided a mixer and throttle valve on an intake passage and there is also provided a fuel gas passage extending from a natural gas cylinder to said mixer through a fuel shut-off valve.

2 Description of the Prior Art

A general diesel engine is provided with an exhaust retarder system to improve the performance of decreasing the vehicle speed but, it has not been popular for the CNG engine in the art taught. One of the typical conventional CNG engine is using the fuel feed system in a gas engine, is filed by the same applicant in Japanese Utility-model Application Laid-open No. Sho 60-92742.

It is well known in the art that a big vehicle is generally provided with an exhaust retarder by providing an exhaust shutter on the exhaust pipe to improve the performance of decreasing the vehicle speed.

Figure 9:
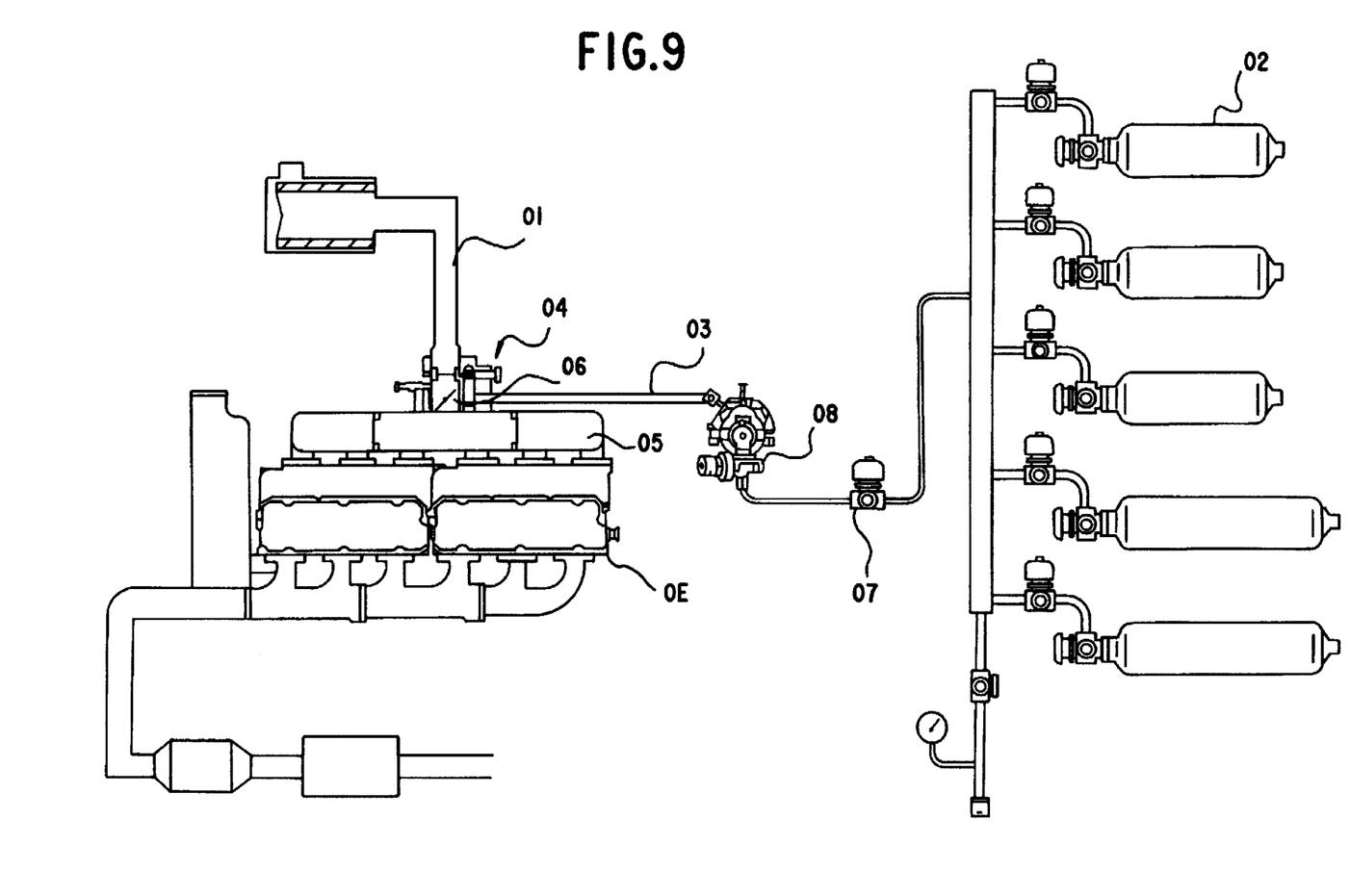
FIG. 9 is a whole diagrammatic view of an entire conventional natural gas engine.

One of the conventional fuel feed systems of the gas engine is shown in FIG. 9 in which fresh air through the intake passage 01 and gas fed from the gas cylinders 02 through a fuel shut-off valve 07 and a regulator 08, are mixed in a mixer 04 at confluence thereof, and the mixture is fed into the engine OE through an intake manifold 05. When the vehicle shifts its running mode from a normal mode to a deceleration mode, a throttle 6 is closed and the fuel shut-off valve 07 is also closed to interrupt the supply of fuel gas. The aforementioned Japanese Utility-model Application Laid-open No. Sho 60-92742 also teaches similar technology.

However, in Japanese Utility-model Application Laid-open No. Sho 60-92742 of which the content has already been explained, there can not be seen any technology relating to an exhaust retarder system. A premixed engine, which has a mixer and a throttle valve positioned after the CNG cylinders and a fuel shut-off valve, also has a by-pass passage skipping the mixer and the throttle valve to an intake pipe, and is also known in the art to control an air/fuel ratio preferably corresponding to the actual driving conditions, but if an exhaust retarder is additionally provided to close a shutter for the exhaust gas, a back fire problem took place. Particularly, in a CNG engine remodeled from a general diesel engine, a business vehicle carrying much luggage could not obtain sufficient performance to decrease its speed, which might cause a traffic accident.

In the premixed engine which sucks therein a mixture with fuel and fresh air such as a gas engine, an installation of such an exhaust retarder is not common because even if an exhaust shutter is provided, some mixture remains in an intake pipe after the fuel valve is closed, whereby a back fire takes place. In a gas engine remodeled from the diesel engine, the deceleration of the vehicle carrying much luggage is not substantially sufficient to assure driving safety.

As known from FIG. 9, an inside volume of fuel in the fuel gas passage 03 from the fuel shut-off valve 07 to the mixer 04 is large, therefore the fuel gas stored therein may be wasted when released from the exhaust pipe through the engine OE. Besides, when the vehicle returns to the normal mode, it takes some time for the feeding fuel gas from the fuel shut-off valve to the engine, which causes an insufficient response to a change in speed.

SUMMARY OF THE INVENTION

The present invention is conceived after reviewing the above-mentioned inferior conventional technology.

Accordingly, it is an object of the present invention to provide a control system for the exhaust retarder in the CNG engine which prevents a back fire due to gas remaining in the intake pipe after the fuel shut-off valve when the exhaust retarder is activated and to improve the pumping loss of the engine.

It is also an object of the present invention to provide an exhaust retarder system for the engine adapted to be operated upon sensing that no fuel is in the admission line, even in the premixed engine.

It is still another object of the present invention to provided a mixing system for the (natural) gas engine in which an inside volume of fuel in the fuel gas passage 03 laying between the fuel shut-off valve 07 and the mixer 04, as shown in FIG. 9, is minimized.

Accordingly, a control system for the exhaust retarder of the compressed natural gas engine in this invention which is connected with the mixer and the throttle valve provided after a compressed natural gas cylinder and after the fuel shut-off valve and of which the intake pipe is accompanied with the by-pass passage to bypass the mixer and the throttle valve, said control system, comprising -off valve on the by-pass passage, so that said on-off valve is opened after a certain interval from when the fuel shut-off valve is closed and an exhaust retarder valve is closed.

An exhaust retarder system in the engine in which the exhaust retarder system for the engine having an exhaust shutter in an exhaust pipe, comprising: a terminating means for feeding fuel into the engine based on an exhaust retarder operation signal; an oxygen richness sensor provided on the exhaust pipe; and a control system operating an actuator of the exhaust shutter when, based on a signal from said oxygen richness sensor, sensing an oxygen density in exhaust gas deviated from a predetermined burning range.

Incidentally, when using natural gas 13A as fuel, the burning range is such that an excess air ratio $\lambda$ is in a range of from 0.58 (a critical point of heavy gas concentration) to 1.74 (a critical point of light gas concentration). When $\lambda=1$, it should be understood as to obtain a theoretical mixture ratio of 10.95 $Nm^3$ which means an air volume of 10.95 $m^3$ is necessary for burning fuel of 1 $m^3$.

Actually, it is recommended to provide an air by-pass passage, bypassing the throttle valve and the mixer. The by-pass passage should be provided with an on-off valve to be opened when activating the exhaust retarder to thereby increase pressure loss.

A mixing system, according to the present invention, of a natural gas engine having an intake passage provided thereon with a mixer and a throttle valve and a fuel gas passage extending from a gas cylinder through a fuel shut-off valve to said mixer, said mixing system, comprising: a fuel shut-off valve adapted to shut an inlet for the fuel gas of said mixer, so that said fuel shut-off valve is closed when a deceleration of the engine is maintained over a predetermined range. As been composed, an engine response measured by a potentiometer for the pedal could be improved.

According to the present control system for the exhaust retarder in the CNG engine, since the exhaust retarder valve is closed after a certain interval, no fuel remains between the fuel shut-off valve and the engine, preventing a back fire. When the flow of air into the engine through the intake pipe is terminated after the exhaust retarder causes the throttle valve to close, only fresh air can be introduced into the engine by opening the on-off valve and the braking action of the vehicle can be obtained by compressive resistance when closing the intake valve, whereby the pumping loss of the engine is improved.

In the present exhaust retarder system in the engine, when the switch of the exhaust retarder is shifted into "ON", the control system provided to the exhaust pipe confirms whether the oxygen richness in the exhaust pipe deviates from the burning range ($\lambda \leq 1.74$) or whether there is any fuel remaining and burning taking place before operating the actuator of the exhaust shutter, so that the back fire does not take place. In other words, it is sufficient to prevent burning in the combustion chamber.

Preferably, the oxygen richness sensor is generally provided on the exhaust line (e.g., a turbo-charger outlet port from the combustion chamber), so that the exhaust shutter can be operated by allowing the necessary time for flowing the exhaust gas from the combustion chamber to the oxygen richness sensor.

The present mixing system of the natural gas engine is provided with the fuel shut-off valve adapted to shut an inlet of the mixer for the fuel gas, so that the volume of fuel gas passage from the fuel shut-off valve to the mixer can be minimized and is also provided with a control system to close said fuel shut-off valve when a deceleration of the engine is maintained over a predetermined range, so that fuel consumption can be control and not wasted when the engine does not require it. Accordingly, upon opening the fuel shut-off valve, the fuel is promptly fed into the engine to improve a quick response of the engine.

DESCRIPTION OF THE PREFERRED EMBODIMENTS

A preferable embodiment of the present invention will hereunder be described with reference to the attached drawings; FIG. 1–FIG. 8.

Figure 1:
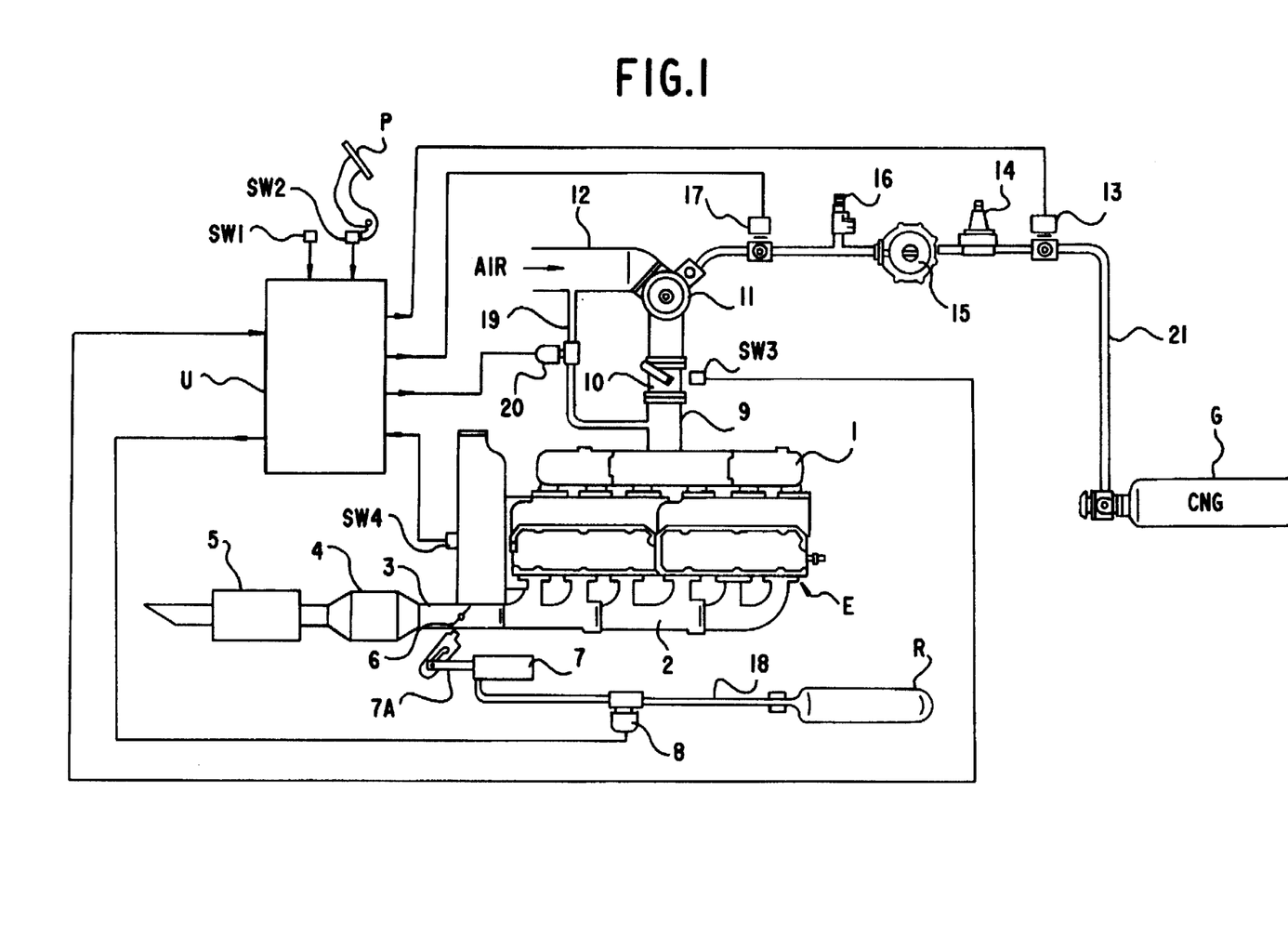
FIG. 1 is a diagrammatic view of the entire overall composition of a control system for an exhaust retarder in a CNG engine according to the present invention.
Figure 2:
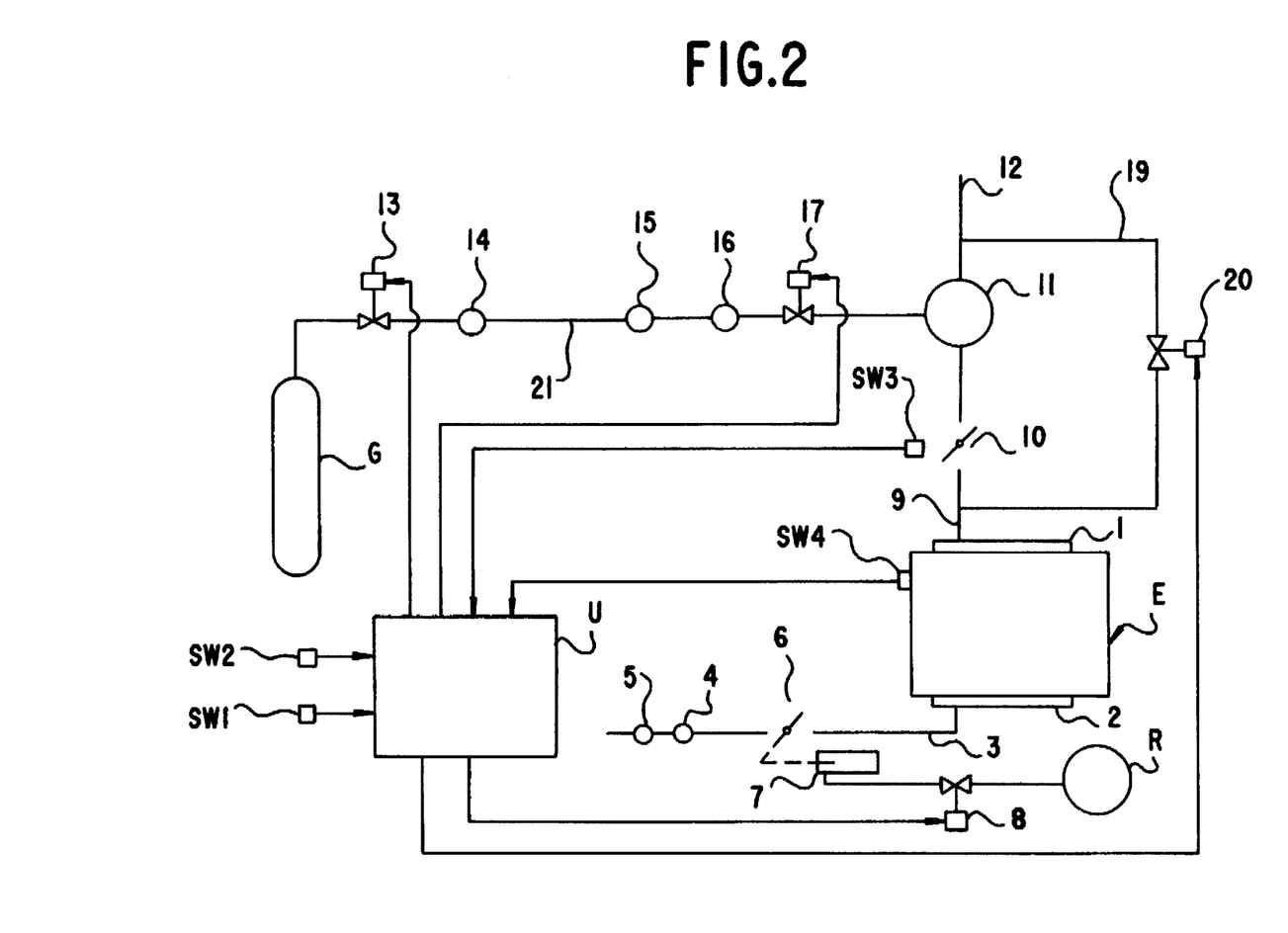
FIG. 2 is a schematical view of the control system for the exhaust retarder in the CNG engine according to the present invention.

As can be seen from FIGS. 1 and 2, an engine E is provided with an exhaust manifold 2 which is connected to an exhaust pipe 3 which is accompanied with an exhaust shutter 6, catalyst 4 and a muffler 5. The exhaust shutter 6 is operationally connected with a piston rod 7A of a cylinder 7 which is joined to an air reservoir R through an air tube 18 having thereon an exhaust retarder valve 8. An intake manifold 1 is connected with an intake pipe 9 which is provided for joining a throttle valve 10 and a mixer 11 and is further connected with an air duct 12.

Incidentally, the intake pipe 9 between the intake manifold 1 and the throttle valve 10 bypasses through a by-pass passage 19 to the air duct 12. The by-pass passage 19 is provided thereon with an air by-pass valve 20 which is an on-off valve.

On a piping 21 extending from a CNG cylinder G to the mixer 11, there is provided a first fuel shut-off valve 13, a first pressure reducing valve 14, a second pressure reducing valve 15, a safety valve 16 and a second fuel shut-off valve 17 in this order.

Now referring to an exhaust retarder control switch SW1, it should be understood to be attached to a combination switch of a steering column (not-shown). A clutch pedal switch SW2 is provided at a base portion P of a clutch pedal P to switch into its "ON" state when the clutch pedal P is released or when the clutch system operates. A throttle valve switch SW3 is provided to switch into its "ON" state when the throttle valve 10 is completely closed. An engine speed sensor SW 4 is provided to an engine E to detect the speed of the engine E.

These signals from the respective switches SW1, SW2, SW3, and the engine speed sensor SW 4 are sent to a control system U which issues control signals to the exhaust retarder valve 8, the first and second fuel shut-off valves 13, 17 and the air by-pass valve 20.

Figure 3:
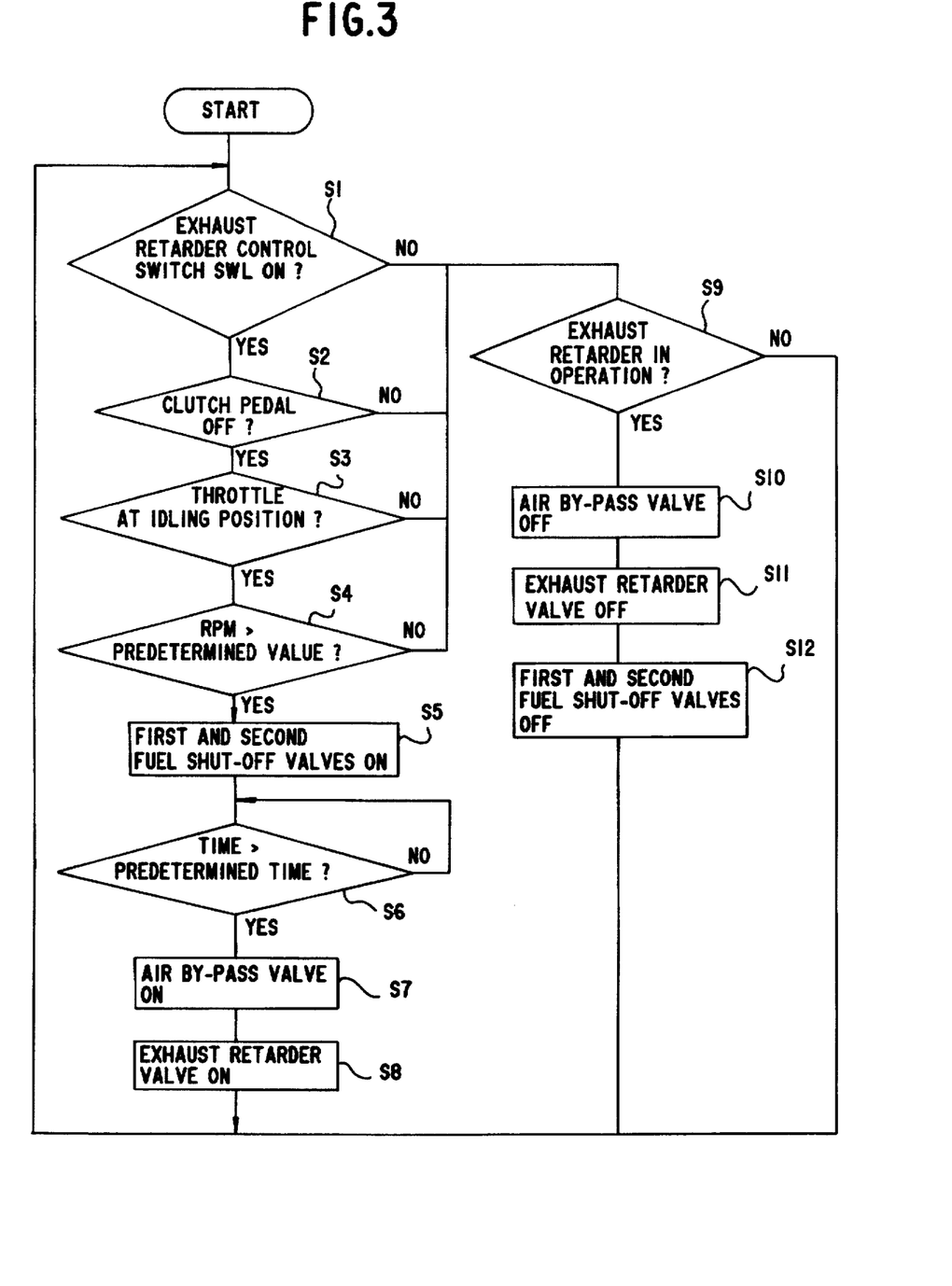
FIG. 3 is a control flowchart of the exhaust retarder.

An operative sequence of the control system for the exhaust retarder, according to the CNG engine in the present invention will be explained in more detail below with reference to FIG. 3.

When a key-switch becomes in its "ON" state, the control system U is activated and determines whether the exhaust retarder control switch SW 1 is in its "ON" state or not (Step S1). If "YES ", the control system U further confirms whether the clutch pedal P is released (or whether the clutch pedal switch SW 2 is in its "ON" state)(Step S2). If "YES", it is confirmed whether the throttle is kept in an idling position (or whether the throttle valve switch SW 3 is in its "ON" state)(Step S3). If "YES", it is further confirmed whether the present revolutions per minute (r.p.m.), representing the engine speed, is more than a predetermined value (or whether the sensor 4 is in its "ON" state)(Step S4). If "YES", the first and second fuel shut-off valves 13, 17 become "ON" to terminate the feeding of the CNG (Step S5). Thereafter, a timer, not shown starts operating and it is checked whether a predetermined time has passed or not (Step S6). Incidentally, this predetermined time is recommended to be about 3 seconds.

If Step 6 is "YES", the air by-pass valve 20 becomes "ON" to supply fresh air through the air duct 12 into the intake manifold 1 (Step S7). Subsequently, the exhaust retarder valve 8 becomes "ON" (Step S8) to feed the compressed air from the air reservoir R into the cylinder 7 to thereby move the piston rod 7A to shut the exhaust shutter 6, stopping the exhaust gas.

If any one of Steps S1 –S4 shows "NO", it is confirmed whether the exhaust retarder is operating or not (Step S9). If Step S9 is "NO", the operation chart resumes from Step S1. On the contrary, when Step S9 is "YES", the air by-pass valve 20 becomes "OFF" to shut the by-pass passage 19, so that the fresh air is supplied to the intake manifold 1 through the mixer 11 (Step S 10).

Next, the exhaust retarder valve 8 becomes "OFF" and therefore the feeding of the compressed air from the air reservoir R is terminated (Step S11). As a result, the piston rod 7A retrieves into the cylinder 7 opening the exhaust shutter 6 (Step S11).

When the exhaust retarder valve 8 becomes "OFF", the first and second fuel shutoff valves 13, 17 are changed to their "OFF" states, so that the CNG is mixed with fresh air at the mixer 11 and supplied into the engine E (Step S12).

After Step S 12, the above-explained operative sequences are repeated from Step S1.

Referring to Step S6 as explained above to determine the certain interval after Step S5, it should not necessarily be limited to being conducted after Step S5, but may be conducted between Step S7 and Step S8, and will produce the same effect.

Now referring to FIGS. 4–6, a preferable example of the exhaust retarder system of the engine according to the present invention will be explained in detail.

Figure 4:
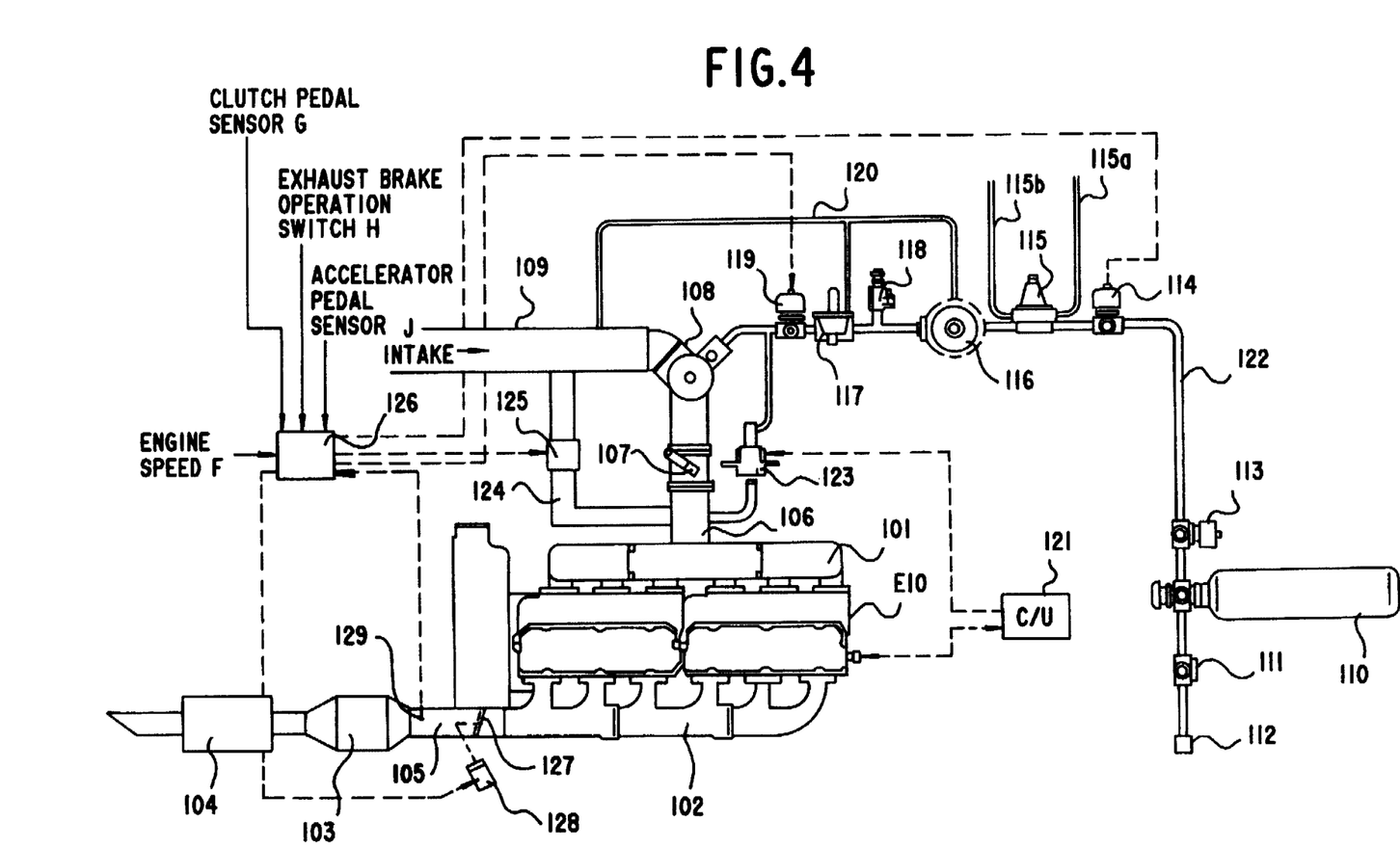
FIG. 4 is a diagrammatic view showing one entire embodiment of the exhaust retarder system in the engine.

As can be seen from FIG. 4, an engine El 0 is provided with an exhaust manifold 102 which is connected to an exhaust pipe 105 which is accompanied with a catalyst 103 and a muffler 104. An intake manifold 101 is connected with an intake pipe 106 which is provided for joining a throttle valve 107 and mixer 108 and is further conducted with an air duct 109.

A cylinder 110 is connected with a filling port 112 through a check-valve 111 and is also connected with a mixer 108 through a fuel circuit 122 on which there are provided an urgent shut-off valves 113, 114, a first pressure reducing valve 115, a second pressure reducing valve 116, a safety valve 118, a third pressure reducing valve 117 and a shut-off valve 119, in this order from the cylinder 110.

A fuel by-pass valve 123 is also provided between the shut-off valve 119 of the fuel circuit 122 and the intake pipe 106. The second pressure reducing valve 116 and the third pressure reducing valve 117 are connected with the air duct 109 through the air circuit 120. The first pressure reducing valve 115 is connected with the water circuits 115a, 115b and is adapted to be cooled by the water circuits.

Incidentally, the fuel by-pass valve 123 is electrically connected with a control unit 121 through an electric circuit laying therebetween.

Between the intake duct 109 and the intake pipe 106 there is an air by-pass passage 124. On the air by-pass passage 124, there is provided an on-off valve 125 to which a control system 126 is electrically connected through an electric circuit.

The control system 126 receives, through a signal transmission line or an electric circuit, signals from the shut-off valves 114, 119, an engine revolution sensor F (not-shown), an exhaust brake operation switch H, an accelerator pedal sensor J and a clutch pedal sensor G.

In the exhaust pipe 105, there is provided an open-close type exhaust shutter 127 operated by an air-cylinder 128. The air-cylinder 128 and an oxygen richness sensor 129 disposed in the exhaust pipe 105 are electrically connected to each other by a control system 126 through an electric circuit.

Figure 5:
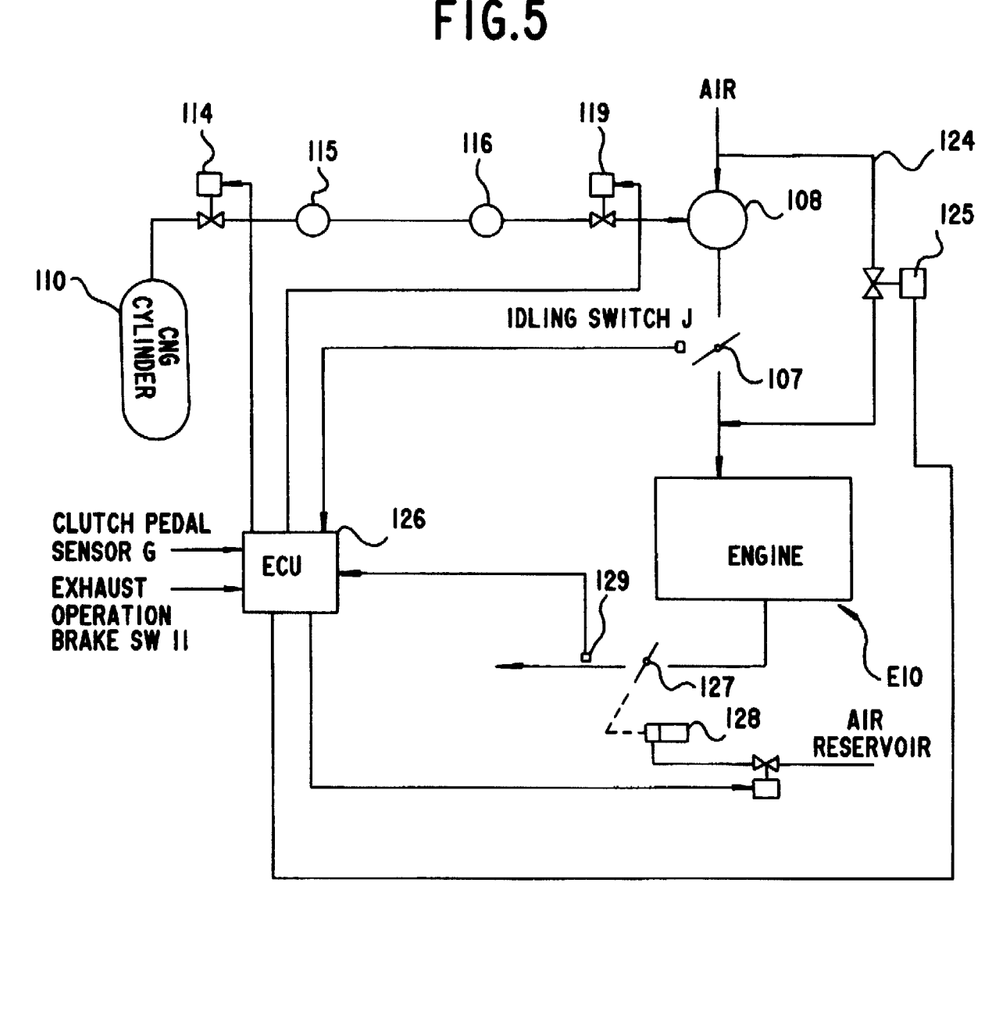
FIG. 5 is a diagrammatic view showing a fragmentary portion in FIG. 4.

FIG. 5 explains details of the embodiment depicted in FIG. 4 where the same and similar components to those in FIG. 1 are denoted by the same reference numerals therefore their explanations will be simplified.

Figure 6:
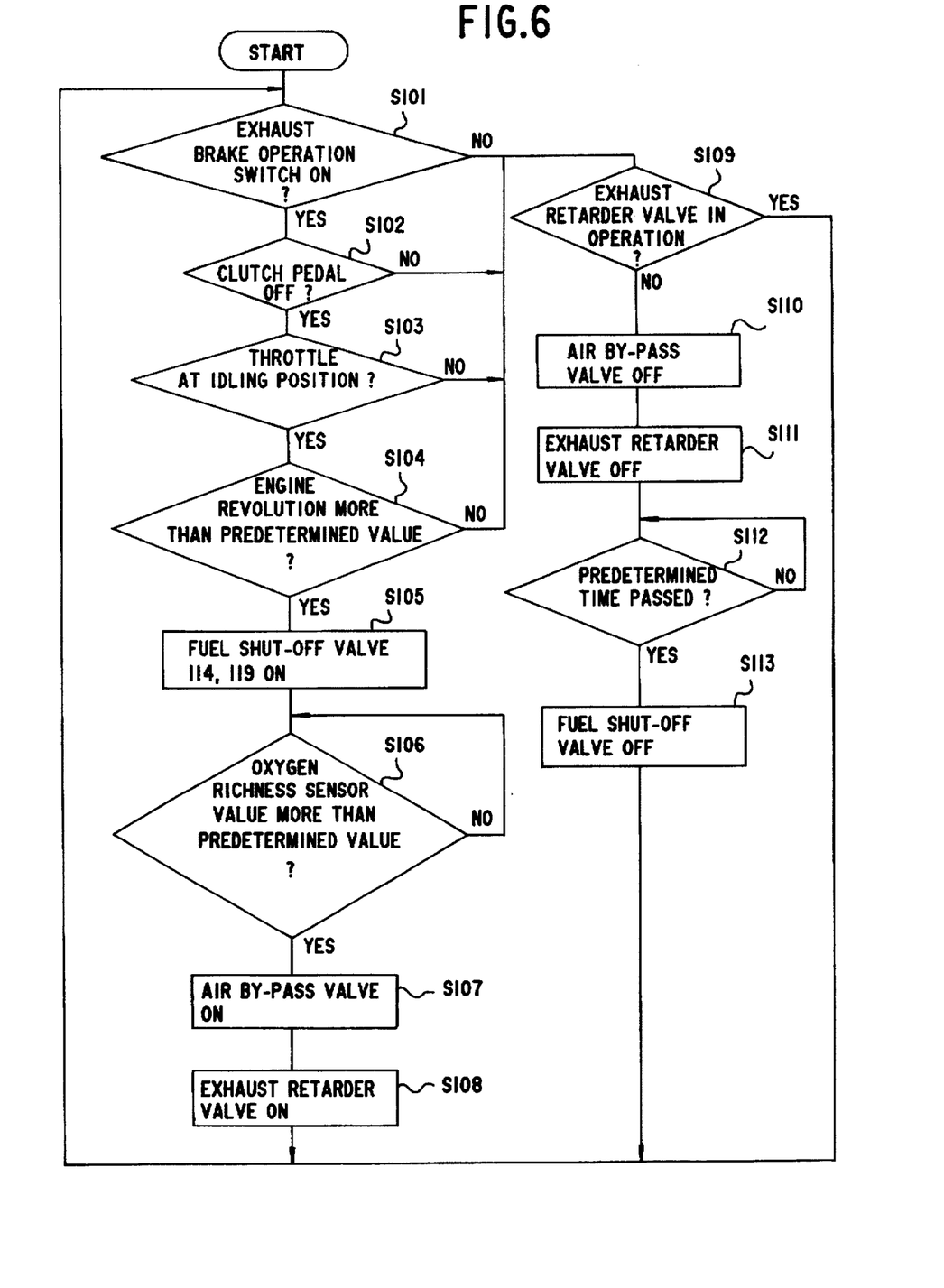
FIG. 6 is a control flow chart of the embodiment shown of FIG. 4.

The operative sequence will hereunder be explained with FIG. 6 along with FIG. 5.

At the beginning of the operation, it is confirmed whether the exhaust brake operation switch H is "ON" (Step S101). If "YES", it is confirmed whether the clutch pedal is "OFF" (Step S102), whether the throttle or throttle valve 107 is kept in the idling position (Step S103) and whether the engine revolution F exceeds a predetermined value (Step S104). When the respective logic circuits (S102, S103, S104) are "YES", the fuel shut-off valves 114, 119 operate (Step S105). Then, the oxygen richness sensor 129 determines whether the sensed value is over a predetermined value (Step S106), and if "YES", the air by-pass valve 125 becomes "ON" (Step S107), the exhaust retarder valve 127 also becomes "ON" (Step S 108) and thereafter the operative sequence returns to its start.

However, when Step S101 shows "NO" or when any one of Steps S102, S103, S104 shows "NO", it is confirmed whether the exhaust retarder is in operation (Step S109). When "YES", the operative sequence begins back at Step S 101 and when "NO", the air bypass valve 125 becomes "OFF" and closes (Step S 11 0) and the exhaust retarder valve 127 changes to its "OFF" state (Step S 111). After a predetermined number of seconds pass (Step S112 is "YES"), the fuel shut-off valves 114, 119 are "OFF", the fuel begins to be fed into the engine and thereafter the steps begin at the start (Step S 113 is "YES").

In the followings, a preferable embodiment of the mixing system in the natural gas engine according to the present invention will be explained in detail with reference to FIG. 7.

Figure 7:
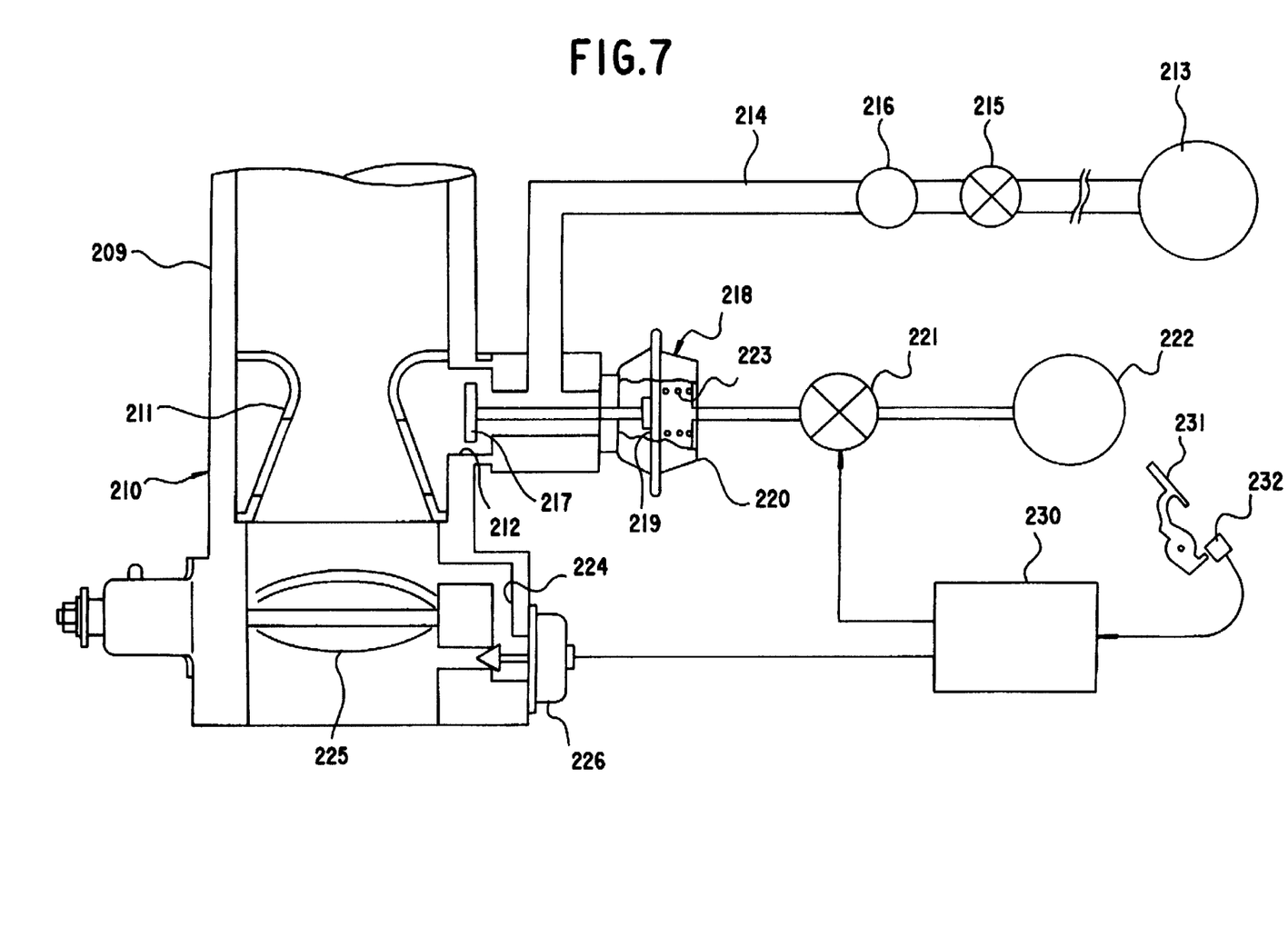
FIG. 7 is a diagrammatic view of the mixing system of the natural gas engine according to the present invention.

As can be seen from FIG. 7, the mixer 210 is located after the intake passage 209 and a venturi 211 is prepared inside. On the wall of the intake passage behind the venturi 211, open is a fuel gas feed opening 212 which is connected with a fuel gas passage 214 extending to a gas cylinder 213. On the fuel gas passage 214, there is provided a fuel shut-off valve 215 and a regulator 216.

The fuel gas feed opening 212 is adapted to open and close by means of a fuel shut-off valve 217 operated by an actuator 218. The actuator 218 has a diaphragm 219 for securing thereon to a base portion of the fuel shut-off valve 217. A space opposite to the base portion of the fuel shut-off valve 217 across from the diaphragm 219 is sealed up by a casing to keep negative pressure therein, so that it joins with a negative pressure source 222 through a normally closed first electromagnetic valve 221. Incidentally, the negative pressure source 222 may be a cylinder which is evacuated by a vacuum pump.

The fuel shut-off valve 217 normally causes the fuel gas feed opening 212 to open by the urging power of a spring 223, but once an operation signal is inputted to open the electromagnetic valve 221, the negative pressure activates the diaphragm 219 which closes the fuel gas feed opening 212 against the spring 223.

After the venturi 211, there is provided a throttle valve 225 associated with a bypass 224 controlled by a normally closed type of second electromagnetic valve 226. The electromagnetic valve 226 is normally closed, and so is the by-pass 224, but when receiving an operation signal (into the electromagnetic valve 226) the by-pass 224 is opened.

A control system 230 operates to send operation signals to the first and second electromagnetic valves 221 and 226 upon the receipt of a deceleration signal. The deceleration signal is, for example, issued from a switch 232 for ON-OFF operation according to an operation degree of the accelerator pedal 231.

Figure 8:
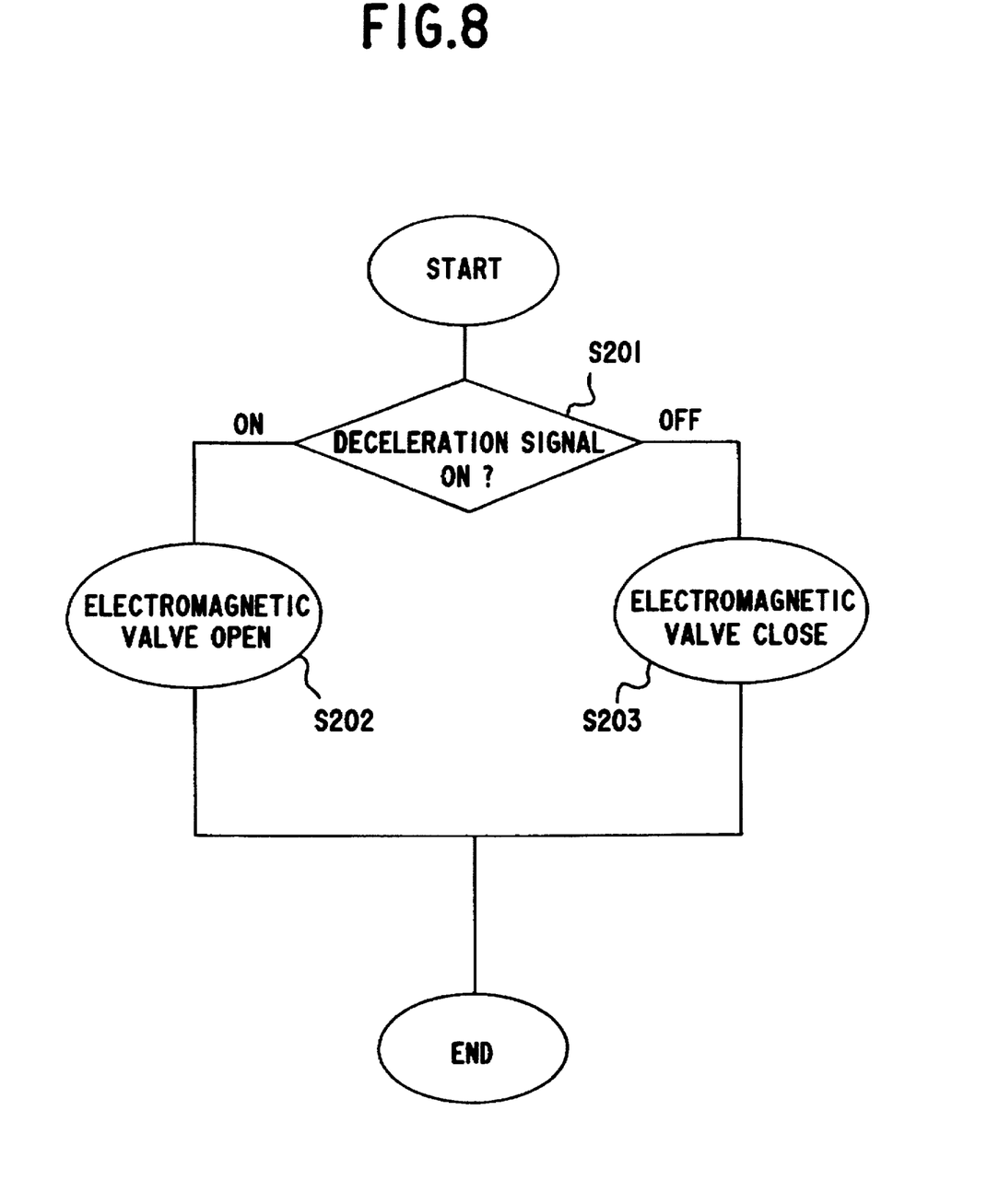
FIG. 8 is a flow chart of the mixing system in a natural gas engine according to the present invention.

The operative sequence in the present invention will hereunder be explained with reference to FIG. 8.

Upon switching the key to its "ON" state, the control system 230 is applied and it is confirmed whether the deceleration signal is "ON" or "OFF" (S201). If the deceleration signal is "ON" or the accelerator pedal 231 is released to shift the switch 232 into its "ON" state (Step S202), the first electromagnetic valve 221 is opened to close the fuel shut-off valve 217 by the actuator 218 and the second electromagnetic valve 226 is opened to feed a minimum amount of air into the engine. On the other hand, when the deceleration signal is "OFF" or the accelerator pedal 231 is stepped on to shift the switch 232 into its "OFF" state (Step S203), both the first electromagnetic valve 221 and the second electromagnetic valve 226 are kept in their closed state.

According to the control system for the exhaust retarder in the compressed natural gas engine of the present invention, since the gas latter to the fuel shut-off valve is never fed into the engine when operating the exhaust retarder, no back-fire takes place. Furthermore, a so-called pumping loss can be improved because of the inlet of fresh air.

Since the exhaust retarder system of the engine is composed as mentioned above, even in a premised engine such as the gas engine, the exhaust retarder can be provided. Accordingly, business vehicle which tend to carry much luggage thereon can obtain sufficient performance to decrease their speed with safety.

The mixing system of the natural gas engine according to the present invention is composed as explained above, so that the fuel gas is not wasted when the deceleration signal is issued and, for acceleration of the vehicle, a lag in the feeding time of the fuel gas will not take place so that a quick response while driving is felt.

We claim:

1. An exhaust retarder system for an engine having an exhaust retarder shutter in an exhaust pipe, comprising:

means for terminating fuel feed into said engine upon receipt of an exhaust retarder shutter operation signal;

an oxygen richness sensor provided on said exhaust pipe; and a control system for operating an actuator for said exhaust retarder shutter when, based on a signal from said oxygen richness sensor, sensed oxygen density in said exhaust pipe deviates from a predetermined oxygen range.

* * * * *